(12) United States Patent
Sugo

(10) Patent No.: US 7,082,358 B2
(45) Date of Patent: Jul. 25, 2006

(54) FAULT DETECTING APPARATUS FOR FOUR-WHEEL DRIVE VEHICLE

(75) Inventor: Yasuhiko Sugo, Saitama-ken (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 11/206,956

(22) Filed: Aug. 19, 2005

(65) Prior Publication Data

US 2006/0041346 A1 Feb. 23, 2006

(30) Foreign Application Priority Data

Aug. 23, 2004 (JP) ............................. 2004-242983

(51) Int. Cl.
    *G06F 19/00* (2006.01)
(52) U.S. Cl. ........................... 701/33; 701/34; 701/69; 701/89; 180/197; 180/248
(58) Field of Classification Search .................. 701/33, 701/34, 36, 51, 63, 65, 67, 69, 87, 88, 89, 701/91, 92
See application file for complete search history.

(56) References Cited

U.S. PATENT DOCUMENTS

| 6,175,317 | B1 * | 1/2001 | Ordentlich et al. ........... 341/58 |
| 6,278,927 | B1 * | 8/2001 | Fox et al. ...................... 701/62 |
| 6,449,549 | B1 * | 9/2002 | Dick ............................. 701/67 |
| 6,450,921 | B1 * | 9/2002 | Glab et al. ................... 477/174 |
| 6,498,974 | B1 * | 12/2002 | Rodrigues et al. ............ 701/69 |
| 6,498,975 | B1 * | 12/2002 | Lee et al. ...................... 701/69 |
| 6,511,397 | B1 * | 1/2003 | Glab et al. ..................... 477/36 |
| 6,834,217 | B1 * | 12/2004 | Erban ............................ 701/1 |
| 6,842,681 | B1 * | 1/2005 | Imai et al. ..................... 701/69 |

\* cited by examiner

*Primary Examiner*—Richard M. Camby
(74) *Attorney, Agent, or Firm*—Westerman, Hattori, Daniels & Adrian, LLP.

(57) ABSTRACT

A fault detecting apparatus for a four-wheel drive vehicle is provided for avoiding without fail any erroneous detection due to a response delay associated with an operation for switching a speed increasing system and due to sudden fluctuations in wheel speed, to highly accurately detect a fault in the speed increasing system. The speed increasing system is configured to transmit a driving force of a prime mover directly to main driving wheels and to sub-driving wheels through associated clutches, and to increase rotational speed of the sub-driving wheels above rotational speed of the main driving wheels when a speed increase instruction signal is outputted. The fault detecting apparatus comprises an S-AWD•ECU for detecting a fault in the speed increasing system, and for disabling the fault detection until a predetermined time has elapsed after a speed increase instruction signal was outputted or after the output of the speed increase instruction signal was stopped.

3 Claims, 10 Drawing Sheets

FIG. 3

| MODE | FORWARD | | | | | | | | BACKWARD | | | |
|---|---|---|---|---|---|---|---|---|---|---|---|---|
| | STRAIGHT AHEAD | | STRAIGHT AHEAD (LDS) | | LEFT CORNERING (DIRECT-COUPLED) | | LEFT CORNERING (SPEED INCREASING) | | STRAIGHT AHEAD | | STRAIGHT AHEAD (LSD) | |
| ELEMENT | ACCELER ATION | DECELER ATION | ACCELER ATION | DECELER ATION | ACCELER ATION | DECELER ATION | ACCELER ATION | DECELER ATION | ACCELER ATION | DECELER ATION | ACCELER ATION | DECELER ATION |
| 1 SPEED INCREASING CLUTCH | – | ON | ON | ON | – | ON | ON | ON | – | ON | – | – |
| 2 DIRECT-COUPLED CLUTCH | ON | ON | ON | ON | ON | ON | – | – | ON | ON | ON | ON |
| 3 LEFT ELECTROMAGNETIC CLUTCH | MIDDLE | SMALL | LARGE | SMALL | LARGE | SMALL | SMALL | SMALL | MIDDLE | SMALL | LARGE | SMALL |
| 4 RIGHT ELECTROMAGNETIC CLUTCH | MIDDLE | SMALL | LARGE | SMALL | LARGE | SMALL | LARGE | SMALL | MIDDLE | SMALL | LARGE | SMALL |

FAULT DETECTING APPARATUS FOR FOUR-WHEEL DRIVE VEHICLE

BACKGROUND OF THE INVENTION

1. Field of the Invention

The present invention relates to a fault detecting apparatus for a four-wheel drive vehicle which transmits a driving force of a motive force directly to a left and a right main driving wheel and to a left and a right sub-driving wheel through a clutch, and is equipped with a speed increasing system for increasing rotational speeds of the sub-driving wheels above rotational speeds of the main driving wheels.

2. Description of the Prior Art

A conventional four-wheel drive vehicle of the type mentioned above is known, for example, from one disclosed in Japanese Patent Publication No. 7-64219. This four-wheel drive vehicle (hereinafter simply called the "vehicle") belongs to the FF type which has an engine arranged, for example, in a front region to use front wheels as main driving wheels and rear wheels as sub-driving wheels. A speed increasing system for transmitting the rotation of a propeller shaft to the rear wheels at an increased speed, and a left and a right hydraulic clutch for distributing a transmitted torque to the left and right rear wheels are disposed between the propeller shaft and the left and right rear wheels.

The speed increasing system comprises an input shaft connected to the propeller shaft, a direct-coupled clutch connected to the input shaft, a speed increasing clutch, an output shaft connected to the rear wheels, a planetary gear mechanism disposed between the direct-coupled clutch and the output shaft. The direct-coupled clutch and the speed increasing clutch are both of hydraulic type, and are controlled for connection and breakage by a piston which moves in accordance with oil pressures supplied to respective oil pressure chambers associated therewith. When the direct-coupled clutch is connected while the speed increasing clutch is broken, the input shaft is directly coupled to the output shaft through the direct-coupled clutch, thereby permitting the output shaft to rotate at the same rotational speed as the input shaft. On the other hand, when the direct-coupled clutch is broken while the speed increasing clutch is connected, the rotation of the input shaft is transmitted to the output shaft through the planetary gear mechanism. Since a total gear change ratio of the planetary gear mechanism is set to a value smaller than 1.0, the rotation of the input shaft is increased before it is transmitted to the output shaft.

Fastening forces of the left and right hydraulic clutches are variably controlled independently of each other by the piston which moves in accordance with oil pressures supplied to the respective oil pressure chambers associated therewith. With the foregoing configuration, the rotational speeds of the rear wheels, which are sub-driving wheels, can be increased above the rotational speeds of the front wheels, which are main driving wheels, by connecting the speed increasing clutch and increasing the fastening forces of the respective hydraulic clutches. As such, a stable cornering ability can be ensured, for example, by controlling the vehicle, during cornering, to increase the rotational speed of the rear wheel on a cornering side above an average rotational speed of the front wheels.

In the vehicle as described above, a fault can be detected in the speed increasing system based, for example, on a relation between the rotational speeds of the input shaft and the output shaft. However, when the speed increasing system is switched from the direct-coupled state to the speed increasing state, and is switched from the speed increasing sate to the direct-coupled state, a response delay of the speed increasing system causes a certain delay until the speed increasing system is actually switched to an intended operating state after an instruction signal is generated to instruct the switching, possibly resulting in an erroneous detection when the aforementioned approach is based to detect a fault. Particularly, the conventional speed increasing system described above is highly susceptible to erroneous detections due to a low responsibility of hydraulic pistons associated with the direct-coupled clutch and the speed increasing clutch, both of which comprise hydraulic clutches. Also, in a situation in which the rotational speed of the front wheels or the rear wheels suddenly fluctuates, the fluctuations result in fluctuations in the relationship between the rotational speeds of the input shaft and the output shaft connected to the front wheels and the rear wheels, respectively, so that a fault detection based on the foregoing approach would possibly result in erroneous detections.

SUMMARY OF THE INVENTION

The present invention has been made to solve the problems as mentioned above, and it is an object of the invention to provide a fault detecting apparatus for a four-wheel drive vehicle which is capable of avoiding without fail any erroneous detection due to a response delay associated with an operation for switching a speed increasing system and sudden fluctuations in wheel speeds, thereby highly accurately detecting a fault of the speed increasing system.

To achieve the above object, the present invention provides a fault detecting apparatus for detecting a fault in a speed increasing system in a four-wheel drive vehicle. The four-wheel drive vehicle is configured to transmit a driving force of a prime mover directly to a left and a right main driving wheel and to a left and a right sub-driving wheel through a clutch. The speed increasing system is configured to increase a rotational speed of the sub-driving wheels above a rotational speed of the main driving wheels when a speed increasing instruction signal is outputted. The fault detecting apparatus is characterized by comprising fault detecting means for detecting a fault in the speed increasing system, and fault detection disabling means for disabling the detection of a fault by the fault detecting means until a predetermined time has elapsed after the speed increase instruction signal was outputted or after the output of the speed increase instruction signal was stopped.

According to this fault detecting apparatus for a four-wheel drive vehicle, a fault in the speed increasing system is detected by the fault detecting means. Also, the fault detection is disabled by the fault detection disabling means until a predetermined time has elapsed after a speed increase instruction signal was outputted for instructing the activation of the speed increasing system or after the output of the speed increase instruction signal was stopped. In this way, since the detection of a fault in the speed increasing system is disabled until the predetermined time has elapsed after the switching was instructed between the activation and stop of the speed increasing system, it is possible to avoid the fault detection which is made before a switching operation is completed by the speed increasing system. Consequently, it is possible to avoid without fail an erroneous detection resulting from a response delay during the switching operation of the speed increasing system and therefore highly accurately detect a fault in the speed increasing system. Also, since the disabled fault detection is released when the predetermined time has elapsed, the fault detection can be immediately started upon completion of the switching operation of the speed increasing system.

Preferably, the fault detecting apparatus for a four-wheel drive vehicle described above further comprises wheel speed detecting means for detecting the respective rotational speeds of the main driving wheels and the sub-driving wheels, wherein the fault detection disabling means disables the fault detection made by the fault detecting means when a difference between the detected rotational speed of the main driving wheels and the detected rotational speed of the sub-driving wheels is larger than a predetermined value.

According to this preferred embodiment of the fault detecting apparatus for a four-wheel drive vehicle, the fault detection in the speed increasing system is disabled when the difference between the detected rotational speeds of the main driving wheels and the sub-driving wheels is larger than the predetermined value. Thus, the fault detection is avoided in a state where sudden fluctuations in the wheel speeds of the main driving wheels and/or the sub-driving wheels, for example, harsh braking causes an instable operation of the speed increasing system coupled therebetween. Consequently, it is possible to avoid without fail an erroneous detection due to sudden fluctuations in the wheel speeds, and therefore more accurately detect a fault.

Preferably, in the fault detecting apparatus for a four-wheel drive vehicle described above, the four-wheel drive vehicle comprises a braking controller for conducting a predetermined braking control for at least one of the main driving wheels and the sub-driving wheels, wherein the fault detection disabling means disables the fault detection made by the fault detecting means when the braking controller is conducting the predetermined braking.

According to this preferred embodiment of the fault detecting apparatus for a four-wheel drive vehicle, the fault detection is disabled in the speed increasing system when a predetermined braking control is being conducted for the main driving wheels and/or the sub-driving wheels. Such a braking control, when conducted, can cause sudden fluctuations in the wheel speeds. Therefore, by disabling the fault detection during the braking control, it is possible to avoid without fail any erroneous detection due to sudden fluctuations in the wheel speeds, which can occur in association with the conducted braking control, to further increase the accuracy of the fault detection.

BRIEF DESCRIPTION OF THE DRAWINGS

FIG. 3 is a table showing the relationship between respective running modes of the vehicle and possible operating states of the electromagnetic clutches;

DETAILED DESCRIPTION OF THE EMBODIMENT

Figure 1:
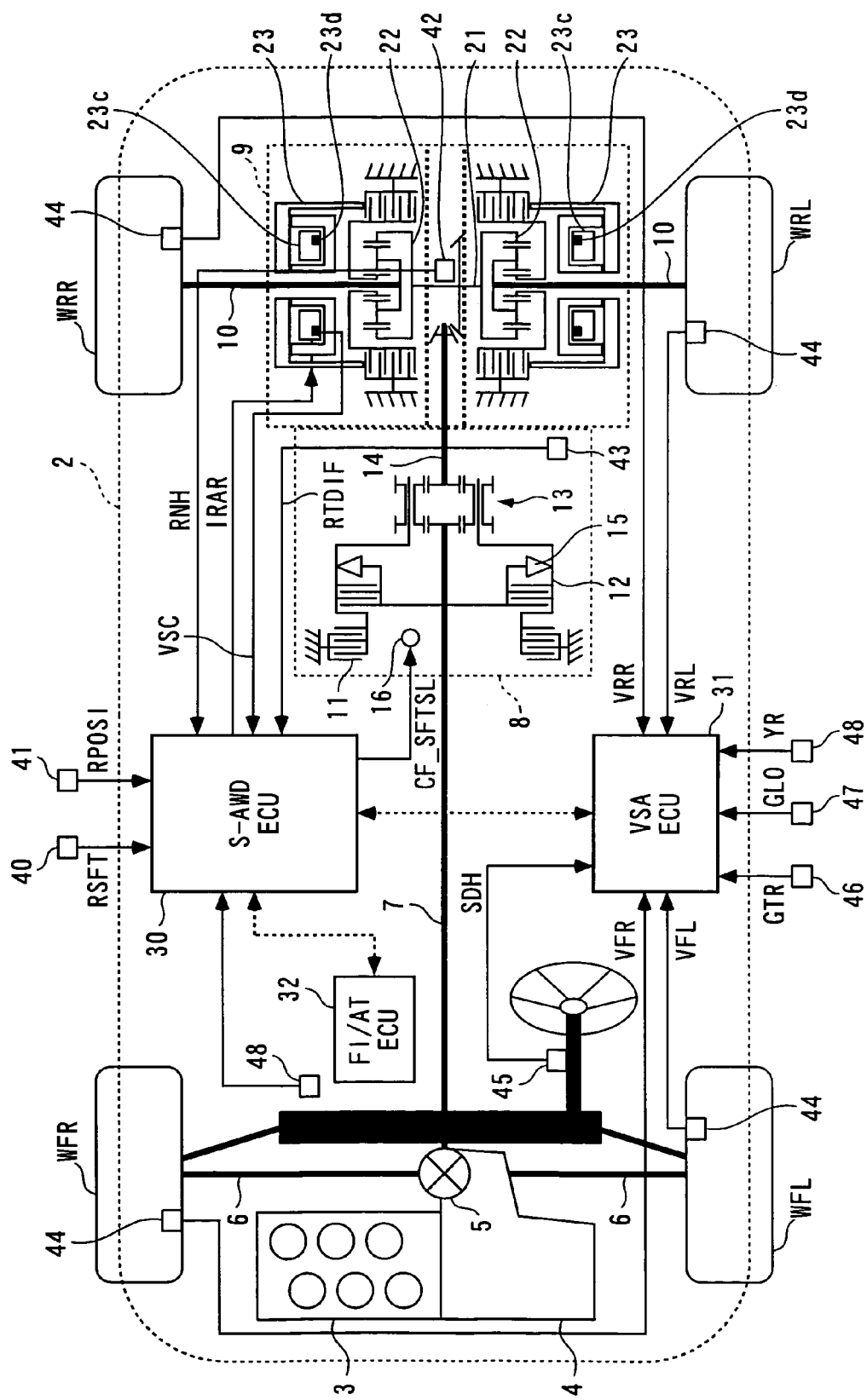
FIG. 1 is a diagram generally illustrating the configuration of a four-wheel drive vehicle which includes a fault detecting apparatus according to the present invention.

In the following, an embodiment of the present invention will be described in detail with reference to the accompanying drawings. FIG. 1 generally illustrates the configuration of a four-wheel drive vehicle 2 to which the present invention is applied. As illustrated, the four-wheel drive vehicle (hereinafter simply called the "vehicle") 2 comprises an engine 3 mounted sideways in a front region thereof, which serves as a prime mover, and an automatic transmission 4 arranged integrally with the engine 3.

Though not shown, the automatic transmission 4 comprises a torque converter coupled to an output shaft of the engine 3; a shift lever for selecting one shift position from eight shift positions consisting of 1, 2, 3, D4, D5, N, P, R; and a gear mechanism for selectively setting six transmission stages consisting of a first to a fifth speed and a reverse.

A current transmission stage of the automatic transmission 4 is detected by a transmission stage sensor 4 which outputs a detection signal RSFT to an S-AWD•ECU 30, later described. The value of the detection signal RSFT (hereinafter called the "RSTF value") is set to one to five when the automatic transmission 4 is at the first to fifth speeds, respectively, and to six when the automatic transmission 4 is at the reverse stage. The shift position of the shift lever is detected by a shift position sensor 41 which outputs a detection signal RPOSI to the S-AWD•ECU 30. The value of the detection signal RPOSI (hereinafter called the "RPOSI value") is set to 1, 2 and 3 to 7, respectively, when the shift lever is positioned at "N" or "P," "R," and "1" to "D5."

The output shaft of the engine 3 is coupled to a left and a right front wheel WFL, WFR, which serve as main driving wheels, through the automatic transmission 4, a front differential 5, and a left and a right front drive shaft 6. The front differential 5 in turn is coupled to a left and a right rear wheel WRL, WRR, which serve as sub-driving wheels, through a transfer (not shown), a propeller shaft 7, a speed increasing system 8, a rear differential 9, and a left and a right drive shaft 10.

The speed increasing system 8 comprises a speed increasing clutch 11, a direct-coupled clutch 12, a planetary gear mechanism 13, an output shaft 14, and the like. The speed increasing clutch 11 comprises a hydraulic multi-plate clutch, and has a clutch outer 11a fixed to a chassis B and a clutch inner 11b, as illustrated in FIG. 2. The direct-coupled clutch 12 also comprises a hydraulic multi-plate clutch, and has a clutch outer 12a integral with the clutch inner 11b of the speed increasing clutch 11, a clutch inner 12b integral with the propeller shaft 7, and a one-way clutch 15 between the clutch outer 12a and the clutch inner 12b (see FIG. 1). The one-way clutch 15 is arranged to block the transmission of a torque, when the rotational speed of the clutch inner 12b exceeds the rotational speed of the clutch outer 12a, such that they turn free.

The speed increasing system 8 also comprises a solenoid valve 16 which is opened and closed under the control of the S-AWD•ECU 30 to connect the speed increasing clutch 11 to and disconnect the same from the direct-coupled clutch 12. More specifically, in response to a speed increasing signal CF_SFTSL (ON driving signal) outputted from the S-AWD•ECU 30 to the solenoid valve 16, the solenoid valve 16 is opened to supply an oil pressure which causes a hydraulic piston (not shown) to actuate to urge the clutch inner 1b of the speed increasing clutch 11 and the clutch outer 12a of the direct-coupled clutch 12 integral with the clutch inner 11b, with the result that the speed increasing clutch 11 is connected, while the direct-coupled clutch 12 is broken. On the other hand, as the output of the speed increasing instruction signal CF_SFTSL is stopped, the solenoid valve 16 is closed to stop the supplied oil pressure, bringing the hydraulic piston into an inoperative state. Also, the direct-coupled clutch 12 is connected by an urging force of a return spring (not shown) simultaneously with the breaking of the speed increasing clutch 11.

The planetary gear mechanism 13 comprises an input sun gear 17 integral with the propeller shaft 7; an output sun gear 18 integral with the output shaft 14; a carrier 19 integral with the clutch inner 11b of the speed increasing clutch 11 and the clutch outer 12a of the direct-coupled clutch 12; and a plurality of pinions 20 rotatably supported by the carrier 19. Each of the pinions 20 is of a dual type which integrally has an input gear 20a in mesh with the input sun gear 17, and an output gear 20b in mesh with the output sun gear 18. The output gear 20b has a number of teeth N3 larger than the number of teeth N2 of the input gear 20a (N3>N2), and the number of teeth N4 of the output sun gear 18 is accordingly set to be smaller than the number of teeth N1 of the input sun gear 17 (N4<N1).

Figure 2A:
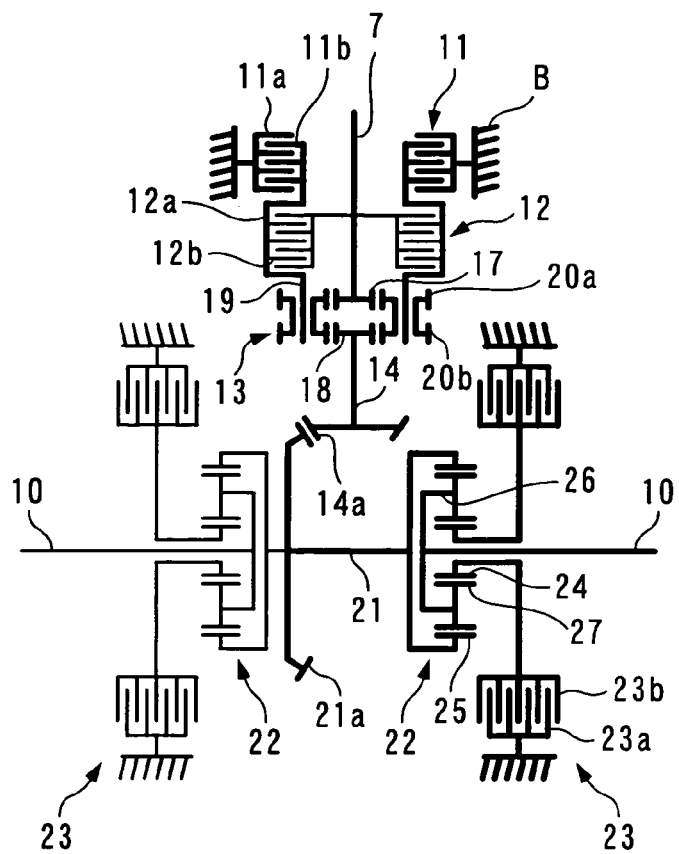
FIGS. 2A and 2B are diagrams illustrating the configuration and operation of the speed increasing system and electromagnetic clutch.
Figure 2B:
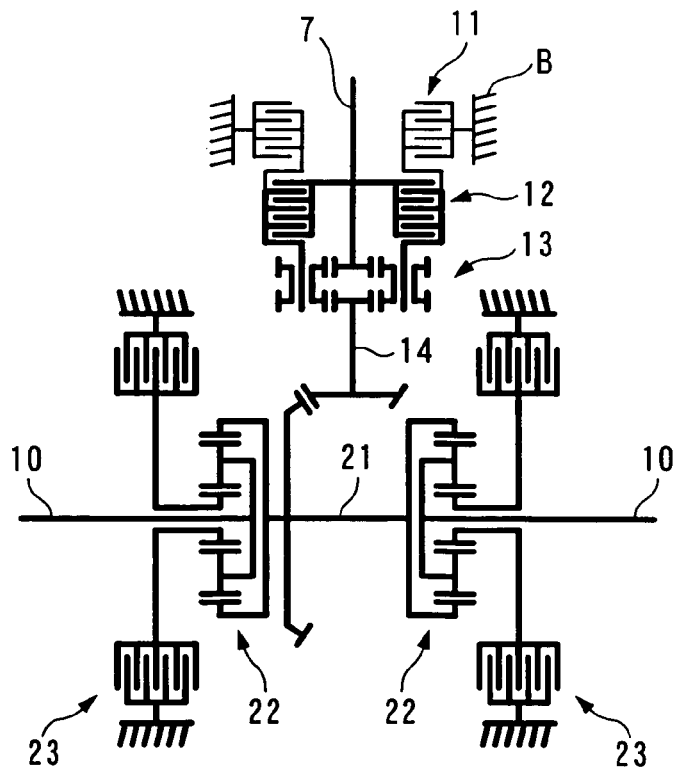

With the foregoing configuration, as the speed increasing clutch 11 is connected while the direct-coupled clutch 12 is broken, the carrier 19 of the planetary gear mechanism 13 is locked by the speed increasing clutch 11, as illustrated in FIG. 2A, permitting the rotation of the propeller shaft 7 to increase and transmit to the output shaft 14 through the input sun gear 17, the pinion 20, and the output sun gear 18 in sequence. A speed increasing rate FZAKSI in this event is expressed by FZAKSI=(N1/N2)•(N3/N4), and is set to 1.05 in this embodiment. In the following description, such an operation mode of the speed increasing system 8 is called the "speed increasing mode."

On the other hand, as the speed increasing clutch 11 is broken while the direct-coupled clutch 12 is connected, the carrier 19 is locked by the direct-coupled clutch 12 to the propeller shaft 7, and integrally rotates with the propeller shaft 7, while the pinions 20 solely revolve. The rotation of the propeller shaft 7 is transmitted to the output shaft 14 through the pinions 20 and the output sun gear 18, and as a result, the output shaft 14 rotates at substantially the same rotational speed as the propeller shaft 7. In the following description, such an operation mode of the speed increasing system 8 is called the "direct-coupled mode."

The rear differential 9 comprises a left and a right planetary gear mechanism for doubling a force; a left and a right electromagnetic clutch 23; and the like. The input shaft 21 extends in a direction from left to right of the vehicle 2, and integrally has an input gear 21a which comprises a bevel gear. This input gear 21a is in mesh with an output gear 14a, which comprises a bevel gear, arranged at one end of the output shaft 14 of the speed increasing system 8, so that the rotation of the output shaft 14 is transmitted to the input shaft 21 through these output gear 14a and input gear 21a. The rotational speed RNH of the input shaft 21 (hereinafter called the "input shaft rotational speed") is detected by an input shaft rotational speed sensor 42 which outputs a detection signal to the S-AWD•ECU 30.

Each of the planetary gear mechanisms 22 comprises a sun gear 24; a ring gear 25 integral with the input shaft 21; a carrier 26 arranged integrally with the rear drive shaft 10; and a plurality of pinions 27 rotatably supported by the carrier 26 and simultaneously in mesh with the sun gear 24 and the ring gear 25.

Each of the electromagnetic clutches 23, which is of a multi-plate type, comprises a clutch outer 23a fixed to the chassis B; a clutch inner 23b integral with the sun gear 24 of the planetary gear mechanism 22; an electromagnetic coil 23c; and a search coil 23d contained in the electromagnetic coil 23c. Fastening forces of the left and right electromagnetic clutches 23 are continuously controlled independently of each other by controlling respective driving currents IRAL (not shown), IRAR supplied to the electromagnetic coils 23c by the S-AWD•ECU 30.

With the foregoing configuration, when the electromagnetic clutches 23 are fastened, the rotation of the input shaft 21 is transmitted to the left and right rear wheels WRL, WRR through the ring gear 25, the pinion 27, the carrier 26, and the rear drive shaft 10 in sequence. In this way, the torque (driving force) of the engine 3 is transmitted to the rear wheels WRL, WRR, so that the vehicle 2 is operated in a four-wheel drive state. The magnitude of the torque transmitted to the rear wheels WRL, WRR varies in accordance with the degree to which the electromagnetic clutches 23 are fastened. Specifically, when the electromagnetic clutches 23 are fully fastened, the sun gear 24 of the planetary gear mechanism 22 is locked to result in the transmission of a maximum torque. Also, as the electromagnetic clutches 23 are fastened to a smaller degree, the transmitted torque gradually decreases in response to an increase in a slipping degree of the sun gear 24. Then, when the electromagnetic clutches 23 are fully broken, the sun gear 24 turns free to transmit no torque to the rear wheels WRL, WRR, so that the torque of the engine 3 is transmitted only to the left and right front wheels WFL, WFR, causing the vehicle 2 to be operated in a front-wheel drive state. The torque distributed to the left and right rear wheels WRL, WRR are independently controlled by controlling the respective driving currents IRAL, IRAR for the left and right electromagnetic clutches 23.

The search coil 23d generates an electromotive force in accordance with the amount of gap between the clutch outer 23a and the clutch inner 23b of the electromagnetic clutch 23, and outputs a detection signal VSC to the S-AWD•ECU 30. Based on the detection signal VSC, the S-AWD•ECU 30 estimates a change in the amount of the gap resulting from the wearing-away of the clutch outer 23a and the clutch inner 23b, and learns and corrects a map (not shown) which defines the relationship between the transmission torques to the rear wheels WRL, WRR and the driving currents IRAL, IRAR to the respective electromagnetic coils 23c based on the result of the estimation.

The speed increasing system 8 is also provided with an oil temperature sensor 43. The oil temperature sensor 43 detects the temperature (oil temperature) RTDIF commonly used for the speed increasing system 8 and the rear differential 9, and outputs its detection signal to the S-AWD•ECU 30.

Further, a wheel speed sensor 44 (wheel speed detecting means) comprised of a rotor and an electromagnetic pickup is attached to each of the front wheels WFL, WFR and the rear wheels WRL, WRR. These four wheel speed sensors 44 detect a left and a right front wheel speed VFL, VFR and a left and a right rear wheel speed VRL, VRR, respectively, and output their detection signals to a VSA•ECU 31. The VSA•ECU 31 (brake controller), which is based on a microcomputer, controls braking forces for the front wheels WFL, WFR and/or the rear wheels WRL, WRR, torques distributed to the rear wheels WRL, WRR, and the like to conduct several braking controls such as a behavior stability control (VSA control), a wheel anti-lock control (ABS control), a traction control (TCS control) and the like for the vehicle 2. For this purpose, the VSA•ECU 31 is applied with a detection signal indicative of a steering angle SDH from a steering angle sensor 45; a detection signal indicative of a lateral acceleration GTR from a lateral acceleration sensor 46; a detection signal indicative of an anteroposterior acceleration GLO from an anteroposterior acceleration sensor 47; and a detection signal indicative of a yaw rate YR from a yaw rate sensor 48, respectively.

The VSA•ECU 31 is connected to the S-AWD•ECU 30, so that the detection signals of the foregoing sensors 44–48 are outputted to the S-AWD•ECU 30 through a serial communication. The S-AWD•ECU 40 is also connected to an FI/AT•ECU 32 which is based on a microcomputer. FI/AT•ECU 32 controls the operation of the engine 3 and the automatic transmission 4, and communicates necessary data with the S-AWD•ECU 30.

The S-AWD•ECU 30, which embodies a fault detecting means and a fault detection disabling means in this embodiment, is based on a microcomputer which comprises a RAM, a ROM, a CPU, an I/O interface (none of which is shown), and the like. The S-AWD•ECU 30 determines an operation mode for the speed increasing system 8 based on a control program stored in the ROM in accordance with the detection signals of the sensors 40–48, outputs a speed increasing instruction signal TZL to the solenoid valve 16 based on the result of the determination, or stops the output, to control the speed increasing system 8. The S-AWD•ECU 30 also determines torques distributed to the rear wheels WRL, WRR, calculates driving currents IRAL, IRAR based on the result of the determination, and outputs the driving signals based on the result of the calculation to the respective magnetic coils 23c associated with the magnetic clutches 23 to control their fastening forces and thus control the torques distributed to the rear wheels WRL, WRR.

FIG. 3 shows the relationship between the running modes of the vehicle 2 and possible operating states of the speed increasing clutch 11, the direct-coupled clutch 12, and the left and right electromagnetic clutches 23. First, in a straight ahead mode, the operation of the speed increasing system 8 is set to a direct-coupled mode, irrespective of moving forward or backward, to control the rotational speed of the output mode 14 to be substantially the same as the rotational speed of the propeller shaft 7. Also, in a straight ahead acceleration mode other than during an LSD control, the fastening force of each electromagnetic clutch 23 is set to a middle value ("middle"), thereby relatively increasing the torques transmitted to the rear wheels WRL, WRR, respectively, to ensure the acceleration performance. On the other hand, in a straight ahead deceleration mode, the fastening force of each electromagnetic clutch 23 is set to a value ("small") smaller than the middle value, thereby reducing the torques transmitted to the rear wheels WRL, WRR, respectively, to improve the fuel economy.

Also, during the execution of the LSD control at a launch or the like, the fastening force of each electromagnetic clutch 23 is set to a larger value ("large") than the middle value in the straight ahead acceleration mode, thereby increasing the torques distributed to the rear wheels WRL, WRR, respectively, while the fastening force of each electromagnetic clutch 23 is set to a small value in the straight ahead deceleration mode, thereby reducing the torques distributed to the rear wheels WRL, WRR, respectively. In this way, a slip of the front wheels WFL, WFR is eliminated appropriately in accordance with an acceleration or a deceleration state.

Further, in a cornering mode, the operation of the speed increasing system 8 is set to a speed increasing mode or a direct-coupled mode by a routine later described. Specifically, when the vehicle speed is middle and the lateral acceleration GTR is relatively large, the speed increasing system 8 is set to the speed increasing mode to increase the speed of the output shaft 14. In a left cornering acceleration mode shown in FIG. 3, the fastening force of the right electromagnetic clutch 23 is set to a large value, while the fastening force of the left electromagnetic clutch 23 is set to a small value. In this way, the rotational speed of the right rear wheel WRR is increased on the outside of the cornering to be larger than an average speed of the front wheels WFL, WFR, and to distribute a larger torque to the right rear wheel WRR than that distributed to the left rear wheel WRL on the inside of the cornering, thereby making it possible to provide high cornering abilities, while avoiding understeering in a running state in which a large lateral acceleration GTR is produced in a middle speed range.

On the other hand, when the vehicle speed is low or high, and the lateral acceleration GTR is relatively small, the speed increasing system 8 is set to the direct-coupled mode, thereby controlling the rotational speed of the output shaft 14 to be substantially the same as that of the propeller shaft 7, and in the left cornering acceleration mode, the fastening force of the right magnetic clutch 23 is set to a large value, while the fastening force of the left electromagnetic clutch 23 is set to a small value in a manner similar to the speed increasing mode. In this way, a torque distributed to the right rear wheel WRR can be increased above a torque distributed to the left rear wheel WRL, without increasing the rotational speed of the right rear wheel WRR, thereby making it possible to ensure stable cornering performance in a low speed range or a high speed range. Though not shown, in a right cornering acceleration mode, the fastening forces of the left and right electromagnetic clutches 23 are set opposite to those in the left cornering acceleration mode.

Figure 4:
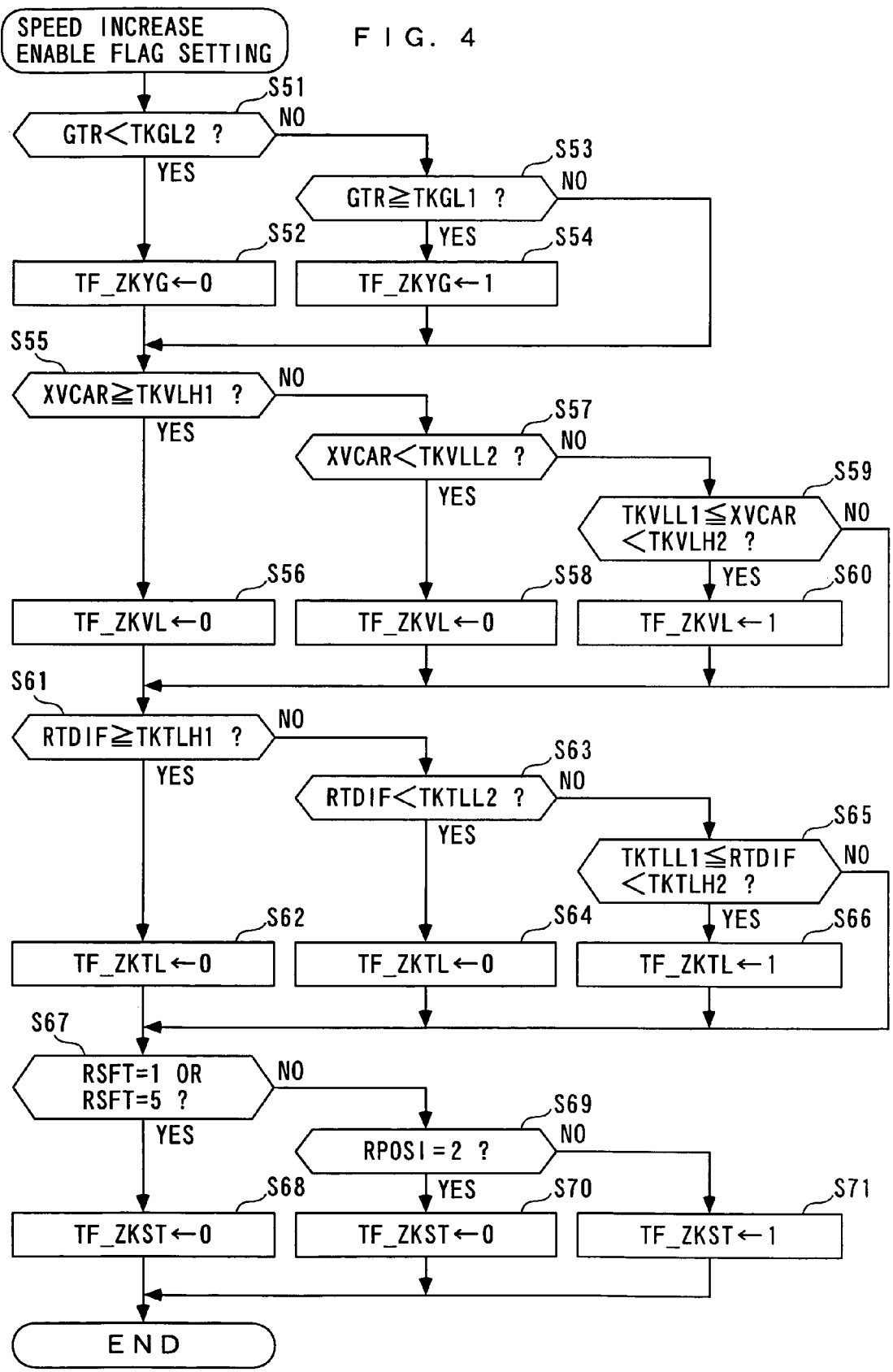
FIG. 4 is a flow chart illustrating a routine for setting a speed increase enable flag.
Figure 5:
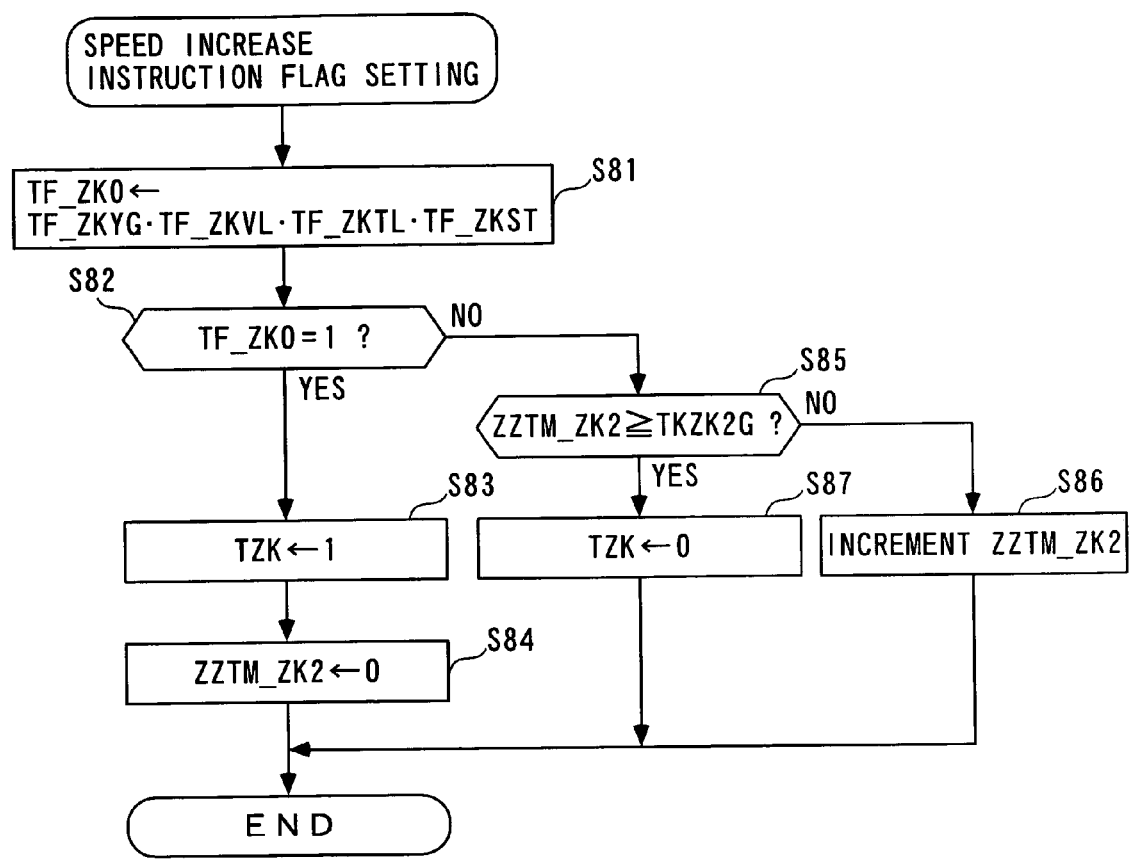
FIG. 5 is a flow chart illustrating a routine for setting a speed increase instruction flag.

Referring next to FIGS. 4 and 5, a description will be given of routines for determining the operation mode for the speed increasing system 8. These routines are executed every predetermined time period. A routine for setting a speed increase enable flag illustrated in FIG. 4 determines whether or not a speed increasing mode execution condition is satisfied by a variety of operation parameters indicative of operating conditions of the vehicle 2 and the engine 3, and sets the speed increase enable flag in accordance with the result of each determination. First, at step 51 (labeled "S51" in the drawing. The same notation applies to the following) of the routine illustrated in FIG. 4, it is determined whether or not the lateral acceleration GTR detected by the lateral acceleration sensor 46 is less than a second predetermined value TKGL2 (for example, 0.070 G). When GTR<TKGL2, i.e., when the lateral acceleration GTR is smaller, the lateral acceleration enable flag TF_ZKYG is set to "0" on the assumption that the execution condition has not been established in terms of the lateral acceleration GTR (step 52).

When the answer to step 51 is NO, it is determined whether or not the lateral acceleration GTR is equal to or larger than a first predetermined value TKGL1 (for example, 0.075 G) slightly larger than the second predetermined value TKGL2 (step 53). When GTR≧TKGL2, showing that the lateral acceleration GTR is larger, the lateral acceleration enable flag TF_ZKYG is set to "1" on the assumption that the execution condition has been established in terms of the lateral acceleration GTR (step 54). On the other hand, when the answer to step 53 is NO, i.e., TKGL2≦GTR<TKGL1, the routine goes to step 55 without performing any processing. Stated another way, since the range from the second predetermined value TKGL2 to the first predetermined value TKGL1 is set as a dead band, the lateral acceleration enable flag TF_ZKYG is maintained unchanged from the preceding value when the lateral acceleration GTR is in this dead band. In the foregoing example, the lateral acceleration GTR is detected by the lateral acceleration sensor 46, but alternatively, the lateral acceleration GTR may be estimated from the rear wheel speeds VRL, VRR or a steering angle SDH detected by the steering angle sensor 45.

Next, at step 55, it is determined whether or not the speed XVCAR of the vehicle 2 (vehicle speed) is equal to or higher than a predetermined first upper limit value TKVLH1 (for example, 120 km/h). This vehicle speed XVCAR may be calculated, for example, from the smaller one of the left and right rear wheel speeds VRL, VRR and the diameter of the wheel. When the answer to step 55 is YES, showing XVCARTKVLH1, a vehicle speed enable flag TF_ZKVL is set to "0" on the assumption that the vehicle speed XVCAR is too high to establish the execution condition in terms with the vehicle speed XVCAR (step 56).

When the answer to step 55 is NO, it is determined whether or not the vehicle speed XVCAR is lower than a predetermined second lower limit value TKVLL2 (for example, 25 km/h) (step 57). When XVCAR<TKVLL2, i.e., when the vehicle XVCAR is too low, the vehicle speed enable flag TF_ZKVL is set to "0" on the assumption that the execution condition has not been established in terms of the vehicle speed XVCAR (step 58). On the other hand, when the answer to step 57 is NO, it is determined whether or not the vehicle speed XVCAR is equal to or higher than a predetermined first lower limit value TKVLL1 (for example, 30 km/h) slightly larger than the second lower limit value KTVLL2, and lower than a predetermined second upper limit value TKVLH2 (for example, 115 km/h) slightly smaller than the first upper limit value TKVLH1 (step 59). When the answer to step 59 is YES, i.e., TKVLL1≦XVCAR<TKVLH2, the vehicle speed enable flag TF_ZKVL is set to "1" on the assumption that the execution condition has been established in terms of the vehicle speed XVCAR (step 60). On the other hand, when the answer to step 59 is NO, i.e., when TKVLL2≦XVCAR<TKVLL1 or TKVLH2≦XVCAR<TKVLH1 is established, showing that the vehicle speed VXCAR is in the dead band, the routine goes to step 61 without performing any processing, to hold the vehicle speed enable flag TF_ZKVL at the preceding value.

Next, it is determined at step 61 whether or not an oil temperature RTDIF detected by the oil temperature sensor 43 is equal to or higher than a predetermined first upper limit value TKTLH1 (for example, 140° C.). When RTDIF≧TKTLH1, an oil temperature enable flag TF_ZKTL is set to "0" on the assumption that the execution condition has not been established in terms of the oil temperature RTDIF (step 62).

When the answer to step 61 is NO, it is determined whether or not the oil temperature RTDIF is lower than a predetermined second lower limit value TKTLL2 (for example, 20° C.) (step 63). When RTDIF<TKTLL2, showing that the oil temperature RTDIF is too low, the oil temperature enable flag TF_ZKTL is set to "0" on the assumption that the execution condition has not been established as well in terms of the oil temperature RTDIF (step 64). On the other hand, when the answer to step 63 is NO, it is determined whether or not the oil temperature RTDIF is lower than a predetermined second upper limit value TKTLH2 (for example, 135° C.) which is equal to or higher than a predetermined first lower limit value TKTLL1 (for example, 25° C.) slightly higher than the second predetermined value TKTLL2 and lower than a second predetermined value TKTLH2 (for example, 135° C.) slightly lower than the first upper limit value TKTLH1 (step 65). When the answer to step 65 is YES, i.e., TKTLL1≦RTDIF<TKTLH2, the oil temperature enable flag TF_ZKTL is set to "1" on the assumption that the execution condition has been established in terms of the oil temperature RTDIF (step 66). On the other hand, when the answer to step 65 is NO, i.e., TKTLL2 RTDIFX<TKTLL1 or TKTLH2RTDIF<TKTLH1 has been established, showing that the oil temperature RTDIF is in the dead band, the routine goes to step 67 without performing any processing, to hold the oil temperature enable flag TF_ZKTL unchanged from the preceding value.

Next, it is determined at step 67 whether or not an RSFT value detected by the transmission stage sensor 40 is one or five. When the answer to step 67 is YES, i.e., when RSFT=1 or 5, that is, when the automatic transmission 4 is set at the first stage or the fifth stage, a transmission enable flag TF_ZKST is set to "0" on the assumption that the execution condition has not been established (step 68). With this setting, the speed increasing mode is disabled when the automatic transmission 4 is set at the first or fifth stage. When the answer to step 67 is NO, it is determined whether or not an RPOSI value detected by the shift position sensor 41 is two (step 69). When the answer to step 69 is YES, i.e., RPOSI=2, showing that the shift lever is positioned at "R" (reverse), the transmission enable flag TF_ZKST is also set to "0" on the assumption that the execution condition has not been established as well (step 70). With this setting, the speed increasing mode is disabled when the vehicle 2 goes backward.

On the other hand, when the answer to step 69 is NO, i.e., when the automatic transmission 4 is at any stage other than the first and fifth stages and the shift lever is at any position other than "R," the transmission enable flag TF_ZKST is set to "1" on the assumption that the execution condition has been established in terms of the operating condition of the automatic transmission 4 (step 71), followed by termination of the speed increase enable flag setting routine.

A routine for setting a speed increase instruction flag illustrated in FIG. 5 is executed to set a speed increase instruction flag TZK for instructing the execution of the speed increasing mode based on the enable flags which have been set in speed increase enable flag setting routine described above. The speed increase instruction flag TZK, and a count value ZZTM_ZK2 of a delay counter, later described, are both initialized to "0" when the engine 3 is started.

First, at step 81, the lateral acceleration enable flag TF_ZKYG, the vehicle speed enable flag TF_ZKVL, the oil temperature enable flag TF_ZKTL, and the transmission enable flag TF_ZKST, which have been set in the routine of FIG. 4, are multiplied with each other, and the resulting product is set as an execution condition flag TF_ZKO. Next, it is determined whether or not the calculated execution condition flag TF_ZKO is "1" (step 82). When this answer is YES, i.e., TF_ZKO=1, that is, the execution conditions are fully satisfied in terms of the lateral acceleration GTR of the vehicle 2, the vehicle speed XVCAR, the oil temperature RTDIF of the rear differential 9, and the operating condition of the automatic transmission 4, the speed increase instruction flag TZK is set to "1" on the assumption that the speed increasing mode should be executed (step 83). The speed increase instruction flag TZK thus set to "1" causes the S_AWD•ECU 30 to apply a speed increase instruction signal CF_SFTSL to the solenoid value 16, thereby opening the solenoid value 16 for executing the speed increasing mode. Then, the count value ZZTM_ZK2 of the delay counter is reset to "0" (step 84), followed by termination of the speed increase instruction flag setting routine.

On the other hand, when the answer to step 82 is NO, i.e., TF_ZKO=0, that is, when at least one of the execution conditions has not been established in terms of the lateral acceleration GTR, the vehicle speed XVCAR, the oil temperature RTDIF, and the operating condition of the automatic transmission 4, it is determined whether or not the count value ZZTM_ZK2 of the delay counter is equal to or larger than a predetermined value TKZK2G (for example, corresponding to 1.0 second) (step 85). When the answer to step 85 is NO, i.e., when ZZTM_ZK2<TKZK2G, the count value ZZTM_ZK2 is incremented (step 86). On the other hand, when the answer to step 85 is YES, i.e., ZZTM_ZK2≧TKZK2G, that is, when a predetermined time corresponding to the predetermined value TKZK2G has elapsed after the execution conditions were not established, the speed increase instruction flag TZK is set to "0" on the assumption hat the direct-coupled mode should be executed (step 87). The speed increase instruction flag TZK thus set to "0" causes the S-AWD•ECU 30 to stop applying the speed increase instruction signal CF_SFTSL to the solenoid value 16, thereby closing the solenoid value 16 to execute the direct-coupled mode.

As described above, the speed increasing mode of the speed increasing system 8 is started immediately once the execution conditions therefor have been established, whereas the direct-coupled mode is started when the predetermined time has elapsed after the execution conditions for the speed increasing mode were not established.

Figure 6:
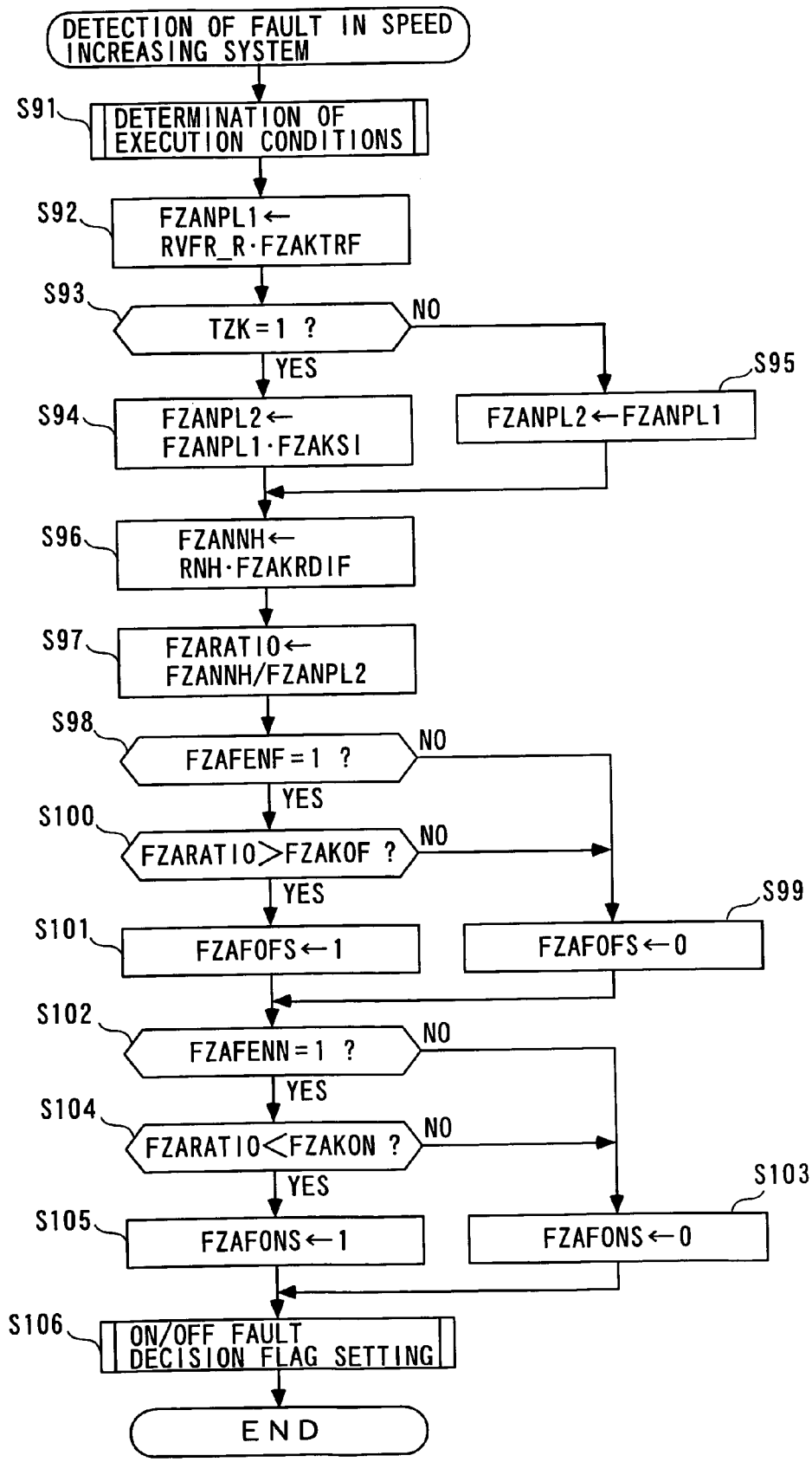
FIG. 6 is a flow chart illustrating a main flow for detecting a fault in the speed increasing system.

Referring next to FIGS. 6 to 10, a description will be given of several routines for detecting a fault in the speed increasing system 8 according to the present invention. These routines are executed every predetermined time period. FIG. 6 illustrates a main routine flow of the fault detection. First, at step 91, an execution condition determination is made to determine whether or not execution conditions have been established for detecting a fault.

Figure 7:
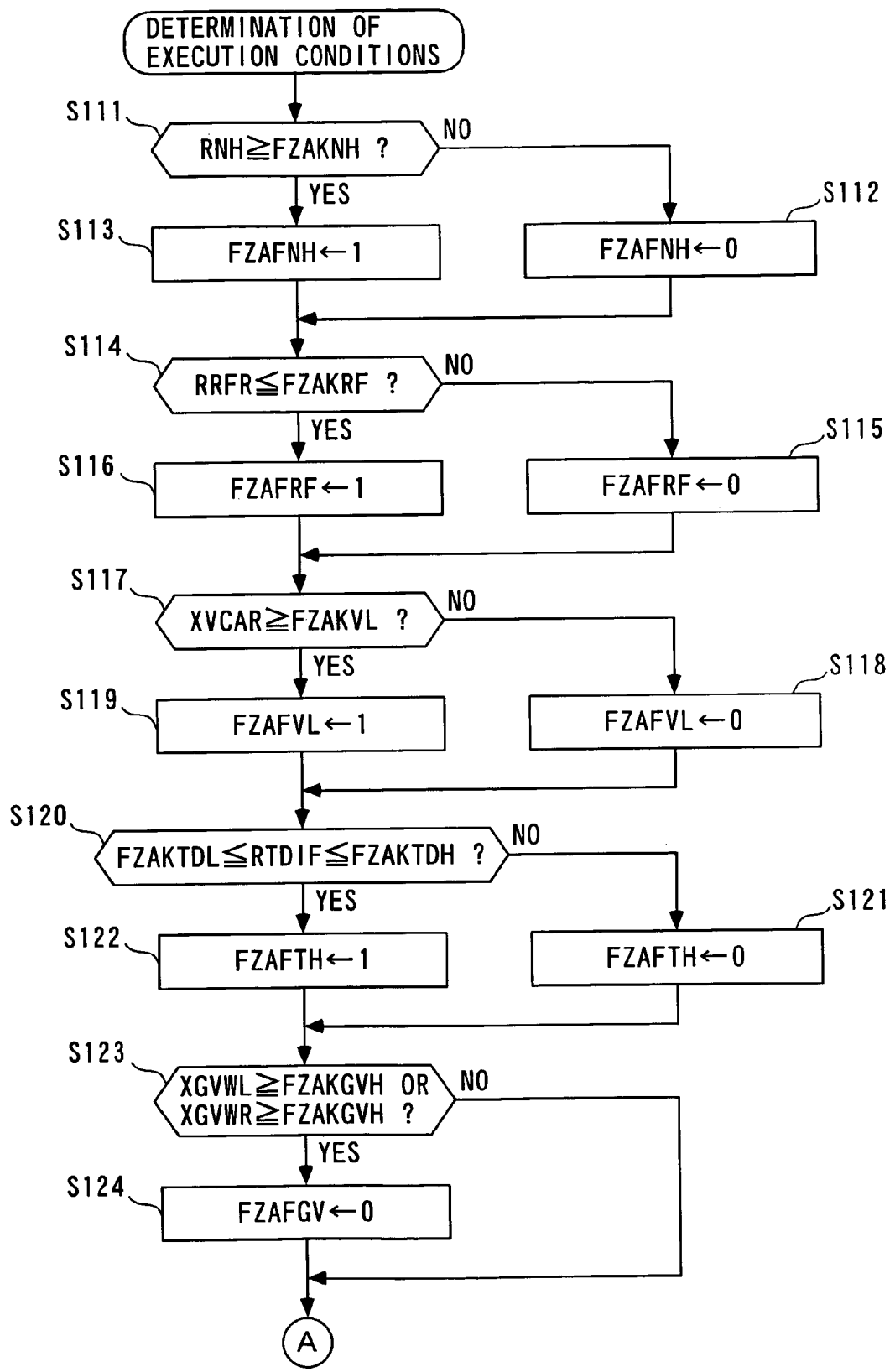
FIGS. 7 and 8 are flow charts illustrating in combination a subroutine for determining an execution condition.
Figure 8:
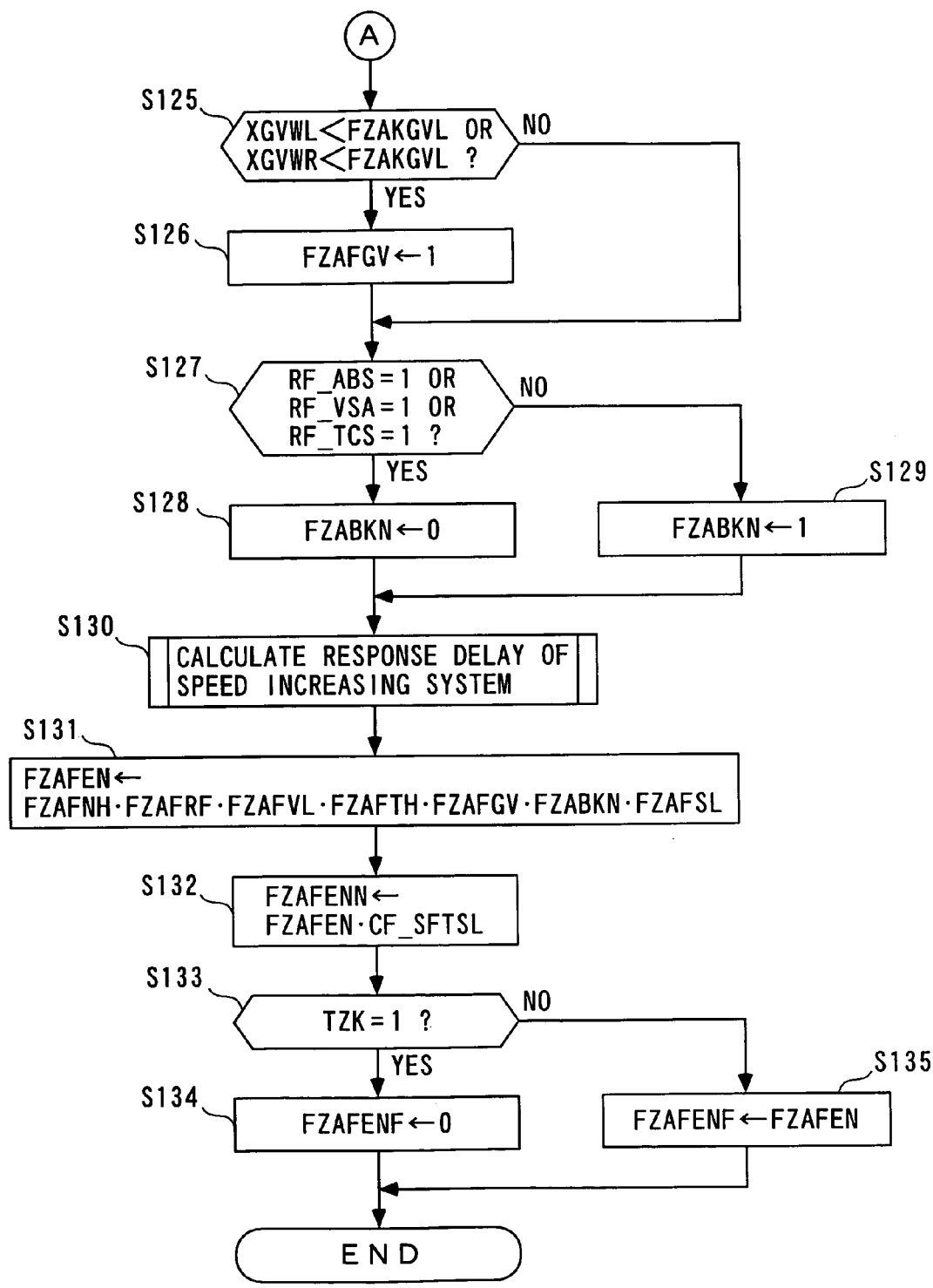

This execution condition determination is made by executing a subroutine illustrated in FIGS. 7 and 8. At step 111 in FIG. 7, it is determined whether or not an input shaft rotational speed RNH of the rear differential 9 detected by the input shaft rotational speed sensor 42 is equal to or higher than a predetermined value (for example, 80 rpm). When the answer to step 111 is NO, i.e., RNH<FZAKNH, a rotational speed enable flag FZAFNH is set to "0" on the assumption that an execution condition has not been established in terms of the input shaft rotational speed RNH from the fact that the input rotational speed RNH is too low so that the input shaft 21 of the rear differential 9 is not in a stable rotating state (step 112). On the other hand, when the answer to step 111 is YES, i.e., RNH≦FZAKNH, the rotational speed enable flag FZAFNH is set to "1" on the assumption that the execution condition has been established (step 113).

Next, it is determined at step 114 whether or not an anteroposterior wheel slipping ratio RRFR is equal to or lower than a predetermined value FZAKRF (for example, 5%). For calculating this anteroposterior wheel slipping ratio RRFR, the difference between an average front wheel speed RVFR_R, which is the average of the left and right front wheel speeds WFL, WFR, and an average rear wheel speed, which is the average of the left and right rear wheel speeds WRL, WRR, is divided by the average front wheel speed RVFR_R, and the resulting quotient is converted into percent (RRFR=((RVFR_R−RVRR_R)/RVFR_R)×100 (%)). When the answer to step 114 is NO, i.e., RRFR>FZAKRF, a slipping ratio enable flag FZAFRF is set to "0" on the assumption that an execution condition has not been established in terms of the anteroposterior wheel slipping ratio RRFR (step 115). On the other hand, when the answer to step 14 is YES, i.e., RRFR≦FZAKRF, the slipping ratio enable flag FZAFRF is set to "1" on the assumption that the execution condition has been established (step 116).

As described above, when the anteroposterior wheel slipping ratio RRFR is higher than the predetermined value FZAKRF, the fault detection is disabled on the assumption that the execution condition has not been established. In this way, no fault is detected in a condition under which the operation of the speed increasing system 8 is instable due to sudden fluctuations in the front wheel speeds VFL, VFR and/or the rear wheel speeds VRL, VRR, for example, in the event of harsh braking and the like, thus making it possible to ensure the avoidance of erroneous detections resulting from sudden fluctuations in the wheel speeds.

Next, it is determined at step 117 whether or not the vehicle speed XVCAR is equal to or higher than a predetermined value FZAKVL (for example, 30 km/h). This predetermined value FZAKVL corresponds to the first lower limit value TKVLL1 for the vehicle speed XVCAR used in the routine illustrated in FIG. 4, i.e., the lowest vehicle speed at which the speed increasing mode is executed in the speed increasing system 8. When the answer to step 117 is NO, i.e., XVCAR<FZAKVL, a vehicle speed enable flag FZAFVL is set to "0" on the assumption that an execution condition has not been established in terms of the vehicle speed XVCAR from the fact that the vehicle speed XVCAR is too low (step 118). On the other hand, when the answer to step 117 is YES, i.e., XVCAR≧FZAKVL, the vehicle speed enable flag FZAFVL is set to "1" on the assumption that the execution condition has been established (step 119).

Next, it is determined at step 120 whether or not the oil temperature RTDIF is equal to or higher than a predetermined lower limit value FZAKTDL (for example, 0° C.) and equal to or lower than a predetermined upper limit value FZAKTDH (for example, 150° C.). When the answer to step 120 is NO, i.e., RTDIF<FZAKTDL or RTDIF>FZAKTDH, an oil temperature enable flag FZAFTH is set to "0" on the assumption that an execution condition has not been established in terms of the oil temperature RTDIF from the fact that the oil temperature RTDIF is not in a predetermined range suitable for the determination (step 121). On the other hand, when the answer to step 120 is YES, i.e., FZAKTDL≦RTDIF≦FZAKTDH, the oil temperature enable flag FZAFTTH is set to "1" on the assumption that the execution condition has been established (step 122).

Next, it is determined at step 123 whether or not any of left and right front wheel accelerations ZGVWL, XGVWR is equal to or higher than a first predetermined value FZAKGVH (for example, 0.4 G). In regard to these front wheel accelerations XGVWL, XGVWR, the left front wheel acceleration XGVWL, for example, is calculated based on the difference between a current value VFLn and the preceding value VFLn−1 of the left front wheel speed VFL. The right front wheel acceleration XGVWR is also calculated in a similar manner. When the answer to step 123 is YES, i.e., when at least one of the front wheel accelerations XGVWL, XGVWR is equal to or higher than the first predetermined value FZAKGVH, an acceleration enable flag FZAFGV is set to "0" on the assumption that an execution condition has not been established in terms of the front wheel accelerations from the fact that the front wheel acceleration XGVWL or XGVWR is too high (step 124). When the answer to step 123 is NO, the subroutine goes to step 125 without performing any processing.

At step 125, it is determined whether or not any of the front wheel accelerations XGVWL, XGVWR is lower than a second predetermined value FZAKGVL (for example, 0.2 G) smaller than the first predetermined value FZAKGVH. When the answer to step 125 is YES, i.e., when at least one of the front wheel accelerations XGVWL, XGVWR is lower than the second predetermined value FZAKGVL, the acceleration enable flag FZAFGV is set to "1" on the assumption that the execution condition has been established (step 126). When the answer to step 125 is NO, the subroutine goes to step 127 without performing any processing.

At step 127, it is determined whether or not any of an ABS execution flag FR_ABS, a VSA execution flag RF_VSA, and a TCS execution flag RF_TCS is "1." These flags RF_ABS, RF_VSA, RF_TCS are respectively set to "1" during the execution of the ABS control, the VSA control, or the TCS control. When the answer to step 127 is YES, i.e., when any of the ABS control, the VSA control, and the TCS control is under execution, a braking control enable flag FZABKN is set to "0" on the assumption that an execution condition has not been established in terms of the braking control (step 128). On the other hand, when the answer to step 127 is NO, i.e., when any of the three braking controls is not being executed, the braking control enable flag FZABKN is set to "1" on the assumption that the execution condition has been established (step 129).

As described above, when any of the ABS control, the VSA control, and the TCS control is being executed, the fault detection is disabled by assuming that the execution condition has not been established. In this way, it is possible to avoid without fail erroneous detections resulting from sudden fluctuations in the wheel speeds which can occur in association with the execution of the braking control as mentioned above.

Next, a response delay of the speed increasing system 8 is calculated at step 130. Though details of the calculation will be described later, a response delay enable flag FZAFSL is set to "0" until a predetermined time has elapsed after the operation mode of the speed increasing system 8 was switched from the direct-coupled mode to the speed increasing mode, and vice versa. Otherwise the response delay enable flag FZAFSL is set to "1."

Next, at step 131, all the enable flags so far set, i.e., the rotational speed enable flag FZAFNH, the slipping ratio enable flag FZAFRF, the vehicle speed enable flag FZAFVL, the oil temperature enable flag FZAFTH, the acceleration enable flag FZAFGV, the braking control enable flag FZABKN, and the response delay enable flag FZAFSL are multiplied with one another, and the resulting product is set as a fault detection enable flag FZAFEN. As will be apparent from this setting method, the fault detection enable flag FZAFEN set to "1" indicates that the execution of the fault detection is enabled from the fact that a variety of the aforementioned execution conditions have been all established, while the fault detection enable flag FZAFEN set to "0" indicates that the execution of the fault detection is disabled from the fact that at least one of the various execution conditions has not been established.

Next, the product of the set fault detection enable flag FZAFEN and the speed increase instruction flag TZK set in the routine of FIG. 5 is set as an ON fault detection enable flag FZAFENN (step 132). Specifically, the ON fault detection enable flag FZAFENN is set to "1" when a fault detection is enabled in the speed increasing mode of the speed increasing system 8 (hereinafter called the "ON fault"). Next, it is determined whether or not the speed increase instruction flag TZK is "1" (step 133). When the answer to step 133 is YES, an OFF fault detection enable flag FZAFENF is set to "0" (step 134). On the other hand, when the answer to step 133 is NO, the OFF fault detection enable flag FZAFENF is set to the same value as the fault detection enable flag FZAFEN (step 135), followed by termination of the execution condition determination subroutine. In other words, the OFF fault detection enable flag FZAFENN is set to "1" when a fault detection is enabled in the direct-coupled mode of the speed increasing system 8.

Figure 9:
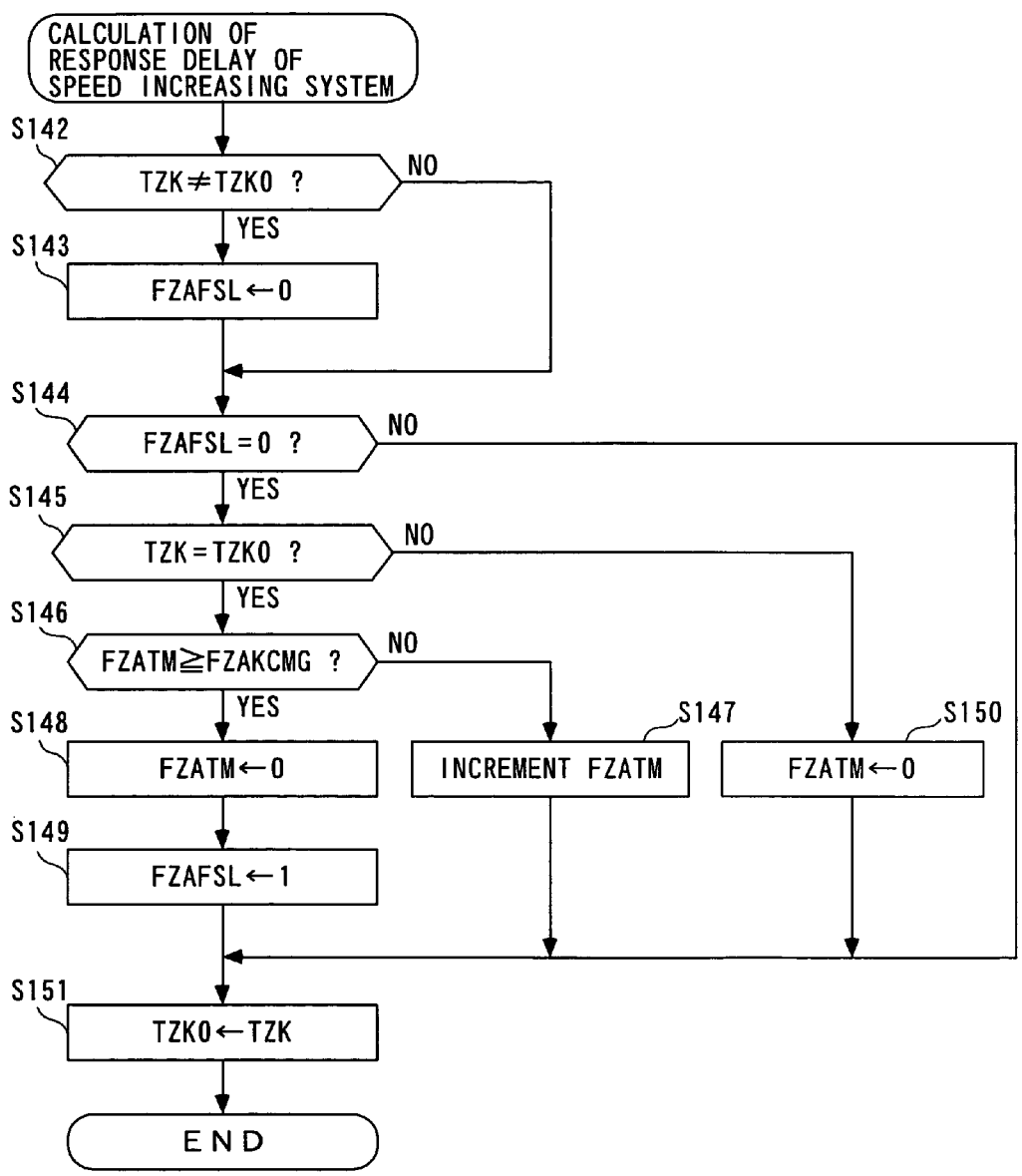
FIG. 9 is a flow chart illustrating a subroutine for calculating a response delay of the speed increasing system.

Next, a subroutine for the calculation of a response delay of the speed increasing system 8, executed at step 130 of the foregoing execution condition determination subroutine, will be described with reference to FIG. 9. Upon start of the engine 3, the response delay enable flag FZAFSL is initialized to "1," and a count value FZATM of a switching counter, later described, is initialized to "0."

First, it is determined whether or not the current speed increase instruction flag TZK is different from its preceding value TZK0 (step 142). If the answer to step 142 is NO, showing that the speed increase instruction flag TZK, i.e., the operation mode of the speed increasing system 8 has not changed between the preceding time and the current time, the subroutine goes to step 144 without performing any processing. On the other hand, when the answer to step 142 is YES, i.e., when the current execution corresponds to a loop immediately after the operation mode of the speed increasing system 8 has been switched from the direct-coupled mode to the speed increasing mode or from the speed increasing mode to the direct-coupled mode, the response delay enable flag FZAFSL is set to "0" (step 143), followed by the subroutine going to step 144. In this way, when the operation mode of the speed increasing system 8 has been switched, a fault detection is disabled in order to avoid an erroneous detection due to a response delay of the speed increasing system 8.

Next, it is determined at step 144 whether or not the response delay enable flag FZAFSL is "0." When the answer to step 144 is NO, i.e., when a fault detection is not disabled due to a response delay, the subroutine goes to step 151, where the current speed increase instruction flag TZK is shifted to the preceding value TZK0, followed by termination of the response delay calculation subroutine.

When the answer to step 144 is YES, i.e., when a fault detection is disabled due to a response delay, it is determined whether or not the speed increase instruction flag TZK is equal to the preceding value TZK0 (step 145). When the answer to step 145 is YES, i.e., when the operation mode of the speed increasing system 8 is held in the same operation mode as the preceding time, it is determined whether or not the count value FZATM of the switching counter is equal to or larger than a predetermined value FZAKCMG (for example, corresponding to 0.3 seconds) (step 146). When the answer to step 146 is NO, i.e., FZATM<FZAKCMG, the count value FZATM is incremented (step 147).

On the other hand, when the answer to step 146 is YES, i.e., FZATM≧FZAKCMG, that is, when a predetermined time corresponding to the predetermined value FZAKCMG has elapsed after the speed increasing system 8 was switched from the speed increasing mode to the direct-coupled mode, and vice versa, the count value FZATM of the switching counter is reset to zero on the assumption that the speed increasing system 8 has completed its switching operation so that a fault detection will no longer affected by an associated response delay (step 148). Then, the response delay enable flag FZAFSL is set to "1" (step 149) to release a disabled fault detection. Next, the aforementioned step 151 is executed, followed by termination of the response delay calculation subroutine.

On the other hand, when the answer to step 145 is NO, the count value FZATM of the operation mode counter is reset to "0" (step 150), followed by the subroutine going to step 151. In this way, when the operation mode of the speed increasing system 8 is again switched while a fault detection is disabled due to a response delay of the speed increasing system 8, the count value FZATM is reset to "0," thereby releasing the disabled fault detection when the operation mode is maintained unchanged for a predetermined time period from that time.

As described above, a fault detection is disabled by setting the response delay enable flag FZAFSL to "0" until the predetermined time has elapsed after the operation mode of the speed increasing system 8 was switched. In this way, a fault detection can be avoided before the speed increasing system 8 has not completed a switching operation. As such, even when the speed increasing clutch 11 and the direct-coupled clutch 12 of the speed increasing system 8 are hydraulic and therefore exhibit a relatively low responsibility as in this embodiment, it is possible to avoid without fail an erroneous detection resulting from a response delay during a switching operation of the speed increasing system 8 and to accurately detect a fault in the speed increasing system 8. Also, the response delay enable flag FZAFSL is set to "1" when a predetermined time has elapsed after the operation mode was switched to release a disabled fault detection, so that a fault detection can be promptly started after the completion of the switching operation of the speed increasing system 8.

Turning back to the routine illustrated in FIG. 6, at step 92 subsequent to the execution condition determination subroutine at step 91, the average front wheel speed RVFR_R is multiplied by a total gear ratio FZAKTRF (for example, 3.396) from the propeller shaft 7 to the front drive shaft 6 to calculate a propeller shaft rotational speed FZANPL1. It is next determined whether or not the speed increase instruction flag TZK is "1" (step 93). When the answer to step 93 is YES, i.e., when the speed increasing system 8 is in the speed increasing mode, the product of the propeller shaft rotational speed FZANPL1 and the speed increasing ratio FZAKSI is set as a reference rotational speed FZANPL2 of the output shaft 14 (step 94). On the other hand, when the answer to step 93 is NO, i.e., when the speed increasing system 8 is in the direct-coupled mode, the propeller shaft rotational speed FZANPL1 is set as it is as the reference rotational speed FZANPL2 of the output shaft 14 (step 95).

Next, the input shaft rotational speed RNH is multiplied by a gear ratio FZAKRDIF (for example, 3.396) of the input gear 21*a* to the output gear 14*a* to calculate an actual rotational speed FZANNH of the output shaft 14 (step 96). Then, calculated next is a rotational speed ratio FZARATIO (=FZANNH/FZANPL2) of the calculated actual rotational speed FZANNH of the output shaft 14 to the reference rotational speed FZANPL2 of the output shaft 14 set at step 94 or 95 (step 97).

It is next determined whether or not the OFF fault detection enable flag FZAFENF set at step 134 or 135 is "1" (step 98). When the answer to step 98 is NO, i.e., when a detection of an OFF fault of the speed increasing system 8 is not enabled, the OFF fault flag FZAFOFS is set to "0" (step 99). When the answer to step 98 is YES, it is determined whether or not the rotational speed ratio FZARATIO calculated at step 97 is higher than a predetermined value FZAKOF (for example, 1.04) for OFF fault detection which is larger than 1.0 (step 100). When the answer to step 100 is NO, i.e., FZARATIO≦FZAKOFF, the routine goes to the aforementioned step 99, where the OFF fault flag FZAFOFS is set to "0" on the assumption that the speed increasing system 8 is free from the OFF fault.

On the other hand, when the answer to step 100 is YES, i.e., FZARATIO>FZAKOF, the OFF fault flag FZAFOFS is set to "1" on the assumption that the speed increasing system 8 is suffering from the OFF fault from the fact that the actual rotational speed FZANNH of the output shaft 14 is actually excessively high though it cannot be excessively high if the speed increasing system 8 is normal in the direct-coupled mode (step 101).

Next, it is determined whether or not the ON fault detection enable flag FZAFENN set at step 132 in FIG. 8 is "1" (step 102). If the answer to step 102 is NO, i.e., a detection of an ON fault of the speed increasing system 8 is not enabled, the ON fault flag FZAFONS is set to "0" (step 103). When the answer to step 102 is YES, it is determined whether or not the rotational speed ratio FZARATIO is lower than a predetermined value FZAKON (for example, 0.97) which is smaller than 1.0 (step 104). When the answer to step 104 is NO, i.e., FZARATIO≧FZAKON, the routine goes to the aforementioned step 103, where the ON fault flag FZAFONS is set to "0" on the assumption that the speed increasing system 8 is not suffering from the ON fault.

On the other hand, when the answer to step 104 is YES, i.e., FZARATIO<FZAKON, the ON fault flag FZAFONS is set to "1" on the assumption that the speed increasing system 8 is suffering from the ON fault from the fact that the actual rotational speed FZANNH of the output shaft 14 is actually excessively low though it cannot be excessively low if the speed increasing system 8 is normal in the speed increasing mode (step 105). Next, an ON/OFF fault decision flag setting subroutine is executed (step 106), followed by termination of the speed increasing system fault detection routine.

Figure 10:
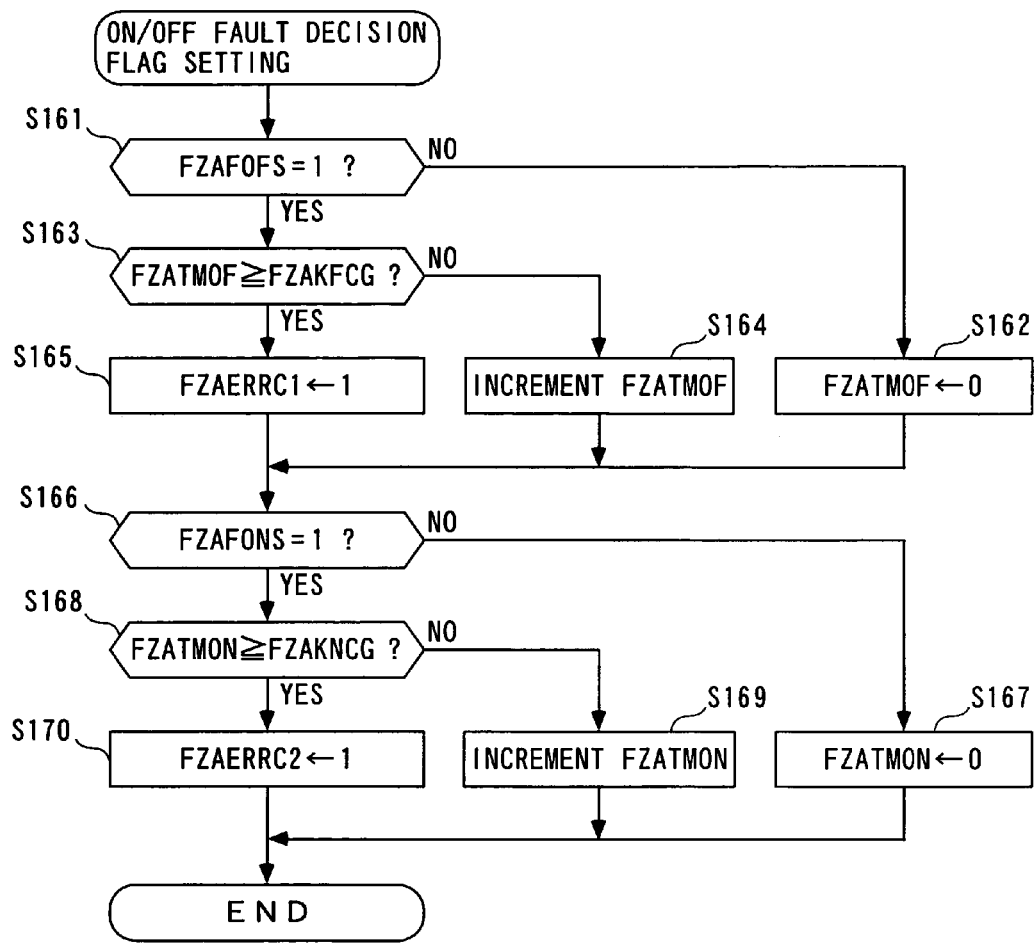
FIG. 10 is a flow chart illustrating a subroutine for setting ON/OFF fault decision flags.

The ON/OFF fault decision flag setting is executed through a subroutine illustrated in FIG. 10. First, in a sequence of steps 161–165, the OFF fault flag FZAFOFS is decided. Specifically, it is determined at step 161 whether or not the OFF fault flag FZAFOFS is "1." When the answer to step 161 is NO, i.e., when no OFF fault is detected in the speed increasing system 8, the count value FZATMOF of the OFF fault counter is reset (step 162). When the answer to step 161 is YES, it is determined whether or not the count value FZATMOF is equal to or larger than a predetermined value FZAKFCG (for example, corresponding to two seconds) (step 163). When the answer to step 163 is NO, i.e., FZATMOF<FZAKFCG, the count value FZATMOF is incremented (step 164). On the other hand, when the answer to step 163 is YES, i.e., FZATMOF≧FZAKFCG, that is, when a detected OFF fault in the speed increasing system 8 has lasted for a predetermined time corresponding to the predetermined value FZAKFCG, the OFF fault decision flag FZAERRC1 is set to "1" on the assumption that the OFF fault is decided (step 165).

Next, the ON fault flag FZAFONS is decided in a sequence of steps 166 to 170. Specifically, it is determined at step 166 whether or not the ON fault flag FZAFONS is "1." When the answer to step 166 is NO, i.e., when no ON fault is detected in the speed increasing system 8, the count value FZATMON of the ON fault counter is reset (step 167). When the answer to step 166 is YES, it is determined whether or not the count value FZATMON is equal to or larger than a predetermined value FZAKNCG (for example, corresponding to 2.0 seconds) (step 168). When the answer to step 168 is NO, i.e., FZATMON<FZAKNCG, the count value FZATMON is incremented (step 169). On the other hand, when the answer to step 168 is YES, i.e., FZATMON≧FZAKNCG, that is, when a detected ON fault in the speed increasing system 8 has lasted for a predetermined time corresponding to the predetermined value FZAKNCG, an ON fault decision flag FZAERRC2 is set to "1" on the assumption that the ON fault is decided (step 170), followed by termination of the flag decision subroutine.

It should be understood that the present invention is not limited to the embodiment described above, but can be practiced in a variety of manners. For example, in the foregoing embodiment, a fault is detected in the speed increasing system 8 based on the relationship between the reference rotational speed FZANPL2 and the actual rotational speed FZANNH of the output shaft 14, but the fault detection approach is not limited to the foregoing but is arbitrary. Also, in the foregoing embodiment, the anteroposterior wheel slipping ratio RRFR calculated in the manner described above is used as a parameter indicative of the difference between the front wheel speeds VFL, VFR and the rear wheel speeds VRL, VRR. Alternatively, another suitable parameter may be used, for example, a simple difference between the average front wheel speed RVFR_R and the average rear wheel speed RVRR_R. Further, while the foregoing embodiment employs the hydraulic speed increasing clutch 11 and direct-coupled clutch 12 of the speed increasing system 8, the clutches are not limited to the hydraulic type, but the present invention can be applied to the detection of fault, for example, in an electromagnetic speed increasing system. Also, while the braking control has been exemplified by the ABS control, the VSA control, and the TCS control, these are merely illustrative, and it goes without saying that other braking controls can be included as long as they affect the detection of a fault in the speed increasing system.

What is claimed is:

1. A fault detecting apparatus for detecting a fault in a speed increasing system in a four-wheel drive vehicle configured to transmit a driving force of a prime mover directly to a left and a right main driving wheel and to a left and a right sub-driving wheel through a clutch, wherein said speed increasing system is configured to increase a rotational speed of the sub-driving wheels above a rotational speed of the main driving wheels when a speed increasing instruction signal is outputted, said apparatus comprising:

fault detecting means for detecting a fault in said speed increasing system; and fault detection disabling means for disabling the detection of a fault by said fault detecting means until a predetermined time has elapsed after the speed increase instruction signal was outputted or after the output of the speed increase instruction signal was stopped.

2. A fault detecting apparatus for a four-wheel drive vehicle according to claim 1, further comprising wheel speed detecting means for detecting the respective rotational speeds of the main driving wheels and the sub-driving wheels, wherein said fault detection disabling means disables the fault detection made by said fault detecting means when a difference between the detected rotational speed of the main driving wheels and the detected rotational speed of the sub-driving wheels is larger than a predetermined value.

3. A fault detecting apparatus for a four-wheel drive vehicle according to claim 1, wherein:

said four-wheel drive vehicle comprises a braking controller for conducting a predetermined braking control for at least one of the main driving wheels and the sub-driving wheels, wherein said fault detection disabling means disables the fault detection made by said fault detecting means when said braking controller is conducting the predetermined braking control.

* * * * *